United States Patent [19]
Ojanen

[11] Patent Number: 5,829,195
[45] Date of Patent: Nov. 3, 1998

[54] WINDOW MODULE FOR MOUNTING IN A SOFT TOPPED VEHICLE

[75] Inventor: Lassi Mauno Ojanen, Richmond Hill, Canada

[73] Assignee: Decoma International Inc., Concord, Canada

[21] Appl. No.: 735,579

[22] Filed: Oct. 23, 1996

[51] Int. Cl.[6] .................................................. E05D 15/48
[52] U.S. Cl. ........................ 49/166; 296/146.2; 296/148; 160/180; 160/368.1
[58] Field of Search ............................... 49/404, 413, 166, 49/502, 504, 505, 163, 164; 296/146.2, 201, 147, 148, 155; 52/204.51; 160/180, 235, 358.1

[56] References Cited

U.S. PATENT DOCUMENTS

| | | | |
|---|---|---|---|
| 1,469,229 | 10/1923 | McAvoy | 49/413 |
| 1,469,922 | 10/1923 | Fleckenstein | 296/148 |
| 2,460,399 | 2/1949 | Schassberger | 296/148 |
| 2,682,427 | 6/1954 | Bright | 296/148 |
| 2,701,162 | 2/1955 | Kliger | 52/204.51 |
| 2,721,636 | 10/1955 | Ordonrica et al. | 49/413 |
| 3,055,700 | 9/1962 | Glas | 296/148 |
| 3,087,537 | 4/1963 | Le Van | 49/413 |
| 3,545,135 | 12/1970 | Lieber | 49/505 |
| 3,605,341 | 9/1971 | Puckett | 49/413 |
| 3,799,607 | 3/1974 | Shakespear | 49/413 |
| 3,800,488 | 4/1974 | Swanson | 49/505 |
| 4,070,056 | 1/1978 | Hickman | 296/148 |
| 4,220,298 | 9/1980 | Willis | 296/148 |
| 4,398,586 | 8/1983 | Hall | 160/105 |
| 4,644,699 | 2/1987 | Chandler et al. | 296/148 |
| 5,325,807 | 7/1994 | Hidekura | 296/107 |
| 5,417,273 | 5/1995 | Bamonte | 296/146.2 |
| 5,560,671 | 10/1996 | Ojanen et al. | 160/368.1 |

*Primary Examiner*—Daniel P. Stodola
*Assistant Examiner*—Curtis Cohen
*Attorney, Agent, or Firm*—Jane Parsons

[57] ABSTRACT

A window unit configured to be removably mounted in an operative position in a motor vehicle having a half door and a soft roof structure disposed above the half door. The window unit comprises a rigid, transparent window panel and a surrounding frame of flexible material. A lower portion of the surrounding frame is configured to be releasably attached to an upper portion of the half door of the motor vehicle. An upper portion of the surrounding frame is configured to be releasably attached to a side edge of the soft roof structure of the motor vehicle. A window frame is mounted within a window-receiving opening formed through the surrounding frame. The window frame has a window track provided therein. The window panel is mounted within the window frame and has an outer peripheral edge thereof received in the window track. The surrounding frame has an inner portion extending around the window-receiving opening. The inner portion is devoid of openings. The window frame engages the inner portion of the surrounding frame in a clamped relationship such that clamping forces are applied to opposing surfaces of the inner portion to thereby securely mount the window frame and the window-panel within the window-receiving opening of the surrounding frame solely by virtue of the aforesaid clamped relationship without forming openings through the inner portion.

23 Claims, 4 Drawing Sheets

WINDOW MODULE FOR MOUNTING IN A SOFT TOPPED VEHICLE

BACKGROUND OF THE INVENTION

1. Field of the Invention

This invention relates to a window module for soft topped vehicles. In particular, it relates to a rigid window side screen releasably attachable, on the one hand, to a half door of a soft topped automobile and, on the other hand, to the soft roof covering of the automobile.

2. Acknowledgement of the Prior Art

Soft topped automobiles of the type popularly known as sport vehicles, often have "half doors" which only extend halfway up the height of the doorway and which do not have windows which may be wound up and down. Such doors may be removed altogether during the summer or for sport purposes. These vehicles present special problems in the provision of a window for the half doors which may be closed in inclement whether or opened when desired. Such windows must attach releasably to the door on the one hand, and to the soft roof covering of the automobile on the other hand. Frequently such windows are provided as units comprising a transparent portion fixed within an outer fabric frame. The outer fabric frame has a releasable sealing strip along its top edge for engagement with a complementary sealing strip along the side edge of the soft roof of the vehicle. The outer fabric frame is also provided with rigid brackets for latching onto the upper part of a half door of the vehicle.

The transparent portion of the unit may be fixed in the outer fabric frame by various means. Sometimes the transparent portion is a rigid or semi-rigid or even a flexible vinyl panel which is connected into the outer fabric frame by means of a zipper along the two rising edges and the top edge. Thus the panel may be opened by unfastening the zipper and allowing the panel to hinge downwardly. Such window units are generally unsatisfactory. The vinyl transparent portion tends to yellow. The zipper, in time, tends to jam and, if any attempt is made to drive the vehicle fast with the window open the hinged panel tends to flap dangerously.

More recently the zipper typed window has been replaced by a rigid transparent glass unit connected to the fabric outer frame through a window frame. The window frame on the one hand holds the window glass and, on the other hand, is fixed into the fabric outer frame. The means of attaching this window frame into the fabric outer frame has caused problems. In some window units of this type the window frame is connected to an inner layer of fabric. A neat appearance is provided to the assembly by an overlapping outer layer of fabric. The use of glass in such windows may cause some further difficulties because the windows may be frequently installed on the car door and uninstalled according to the wishes of the vehicle user and independence upon the weather. When the windows are uninstalled they may be stacked in places where they are at risk of being scratched or broken. Glass is a somewhat vulnerable material for an item potentially subject to rough usage.

Fixed windows have been provided in soft topped vehicles such as automobiles, tents, tent trailers and boats. These fixed windows may be zippered windows such as those already described for releasably attachable window units or may be a window such as described in U.S. Pat. No. 5,560,671 issued Oct. 1, 1996 to Ojanen et al. and assigned to the same assignee as the present application. The window of U.S. Pat. No. 5,560,671 has an outer flange extending outwardly of the frame flush with the front surface of the frame. Fabric of the soft top of the automobile is attached to this outer flange by means of glue and/or studs. The fabric may be folded inwardly or provided with a casing to neaten its edge and lies in the angle between the frame and the outer flange. Such windows can be made to present a very neat appearance because the outer flange overlies the fabric on the outside of the soft top of the vehicle and the folded over or cased fabric at least partially fills the angle between the frame and the outer flange on the inside of the vehicle thus presenting a relatively neat appearance on the inside also. Nevertheless, actual assembly of this window into the soft top of the vehicle is quite labour intensive due to the need to arrange the fabric neatly. The present inventor has attempted to devise a rigid openable window unit which is releasably attachable to a half door of a motor vehicle on the one hand and which is releasably attachable to a soft roof cover of the vehicle. The inventor also attempted to provide a window frame structure adapted to ease difficulties in assembly of the window unit. The inventor also aimed to provide a window unit which may be used in the aftermarket to replace older, broken or unsatisfactory existing units or which may be used as part of the initial equipment provided by the vehicle manufacturer (O.E.M.). SUMMARY OF THE INVENTION Accordingly, the invention provides a window module for mounting directly into the soft top of a soft topped vehicle or into a window unit for releasable mounting on a half door of an automobile and releasably attachable in sealing relationship with a top side edge of a soft top of the vehicle at least extending over the half of the door. The module comprises a window frame attaching the window panel into surrounding fabric, the window frame having a continuous inwardly directed U-channel and comprising an interior frame portion and a exterior frame portion connected together; means to clamp an inner edge of surrounding fabric to the window frame; a track lodged in the U-channel, and the track confining an outer edge of said window panel.

The invention also provides a window unit for releasable mounting on a half door of an automobile and releasably attachable in sealing relationship with a top side edge of a soft top of the vehicle at least extending over half of the door comprising: a window panel of rigid, transparent plastics material; a surrounding frame of fabric material having, at a lower portion, means for releasable attachment to a half door of a motor vehicle and, at an upper edge, means for releasable attachment in sealing relationship with a top side edge of a soft roof cover of the vehicle; a window frame attaching the window panel into the surrounding fabric frame, the window frame having a continuous inwardly directed U-channel and comprising an interior frame portion and an exterior frame portion connected together; means to clamp an inner edge of the surrounding fabric frame to the intermediate frame; a track lodged in the U-channel, and the track confining an outer edge of said window panel.

Preferably the window panel comprises a fixed sub-panel and a sliding sub-panel. The sliding sub-panel lies parallel with the fixed sub-panel and slides in a U-shaped section of the track between an open position and a closed position. Preferably, in the closed position, the sliding panel overlies the fixed panel along vertical margins of each of them and the sliding panel moves laterally to slide in parallel top and bottom parts of the U-shaped section of the track to open or close the window. The fixed sub-panel may be confined between one leg of the track on the outer side thereof and the interior frame portion of the window frame. The fixed sub-panel may be fixed by means of a heat staked pin from the interior frame portion extending through the thickness of the sub-panel.

The interior and exterior frame portions may be connected together in any convenient manner for example, they may be provided with complementary resilient latches so that the may be snapped together for easy assembly, or they may be force fitted together. Alternatively, they may be glued together, bolted together, welded together, screwed together, etc. When the interior and exterior frame parts are force fitted together, the join may be reinforced by gluing, bolting, welding, etc.

The means to clamp the inner edge of the surrounding fabric frame may be a clamp formed between the interior and exterior frame portions. Alternatively a decorative trim may be provided exteriorly of the exterior frame portion and the outer edge of the surrounding fabric frame portion may be clamped between the decorative trim and the exterior frame. The decorative trim advantageously may be of L-section having a short leg forming a cover for the exterior frame and an exterior leg of the track.

The transparent window panel, whether it be a single panel or whether it comprises a fixed sub-panel and a sliding panel is preferably formed of transparent polycarbonate such as hard automotive approved polycarbonate such as Lexan or Tuffak. Lexan is a Trademark of General Electric Company and Tuffak is a Trademark of Atohaas. The sliding window may be easily opened and closed by sliding, especially if a spacer bar is present between the fixed panel and the sliding panel to prevent contact of adjacent faces. This window is not subject to the age yellowing which is a problem of existing soft PVC window within a predictable period of service (say 4000 hours of accelerated weathering and two years of actual outdoor weathering).

A protective hard coating, such as Marguard(Trademark) or CM2(Trademark), on both sides of window provides protection against scratching, chemicals and the elements. The actual material of the protective coating may be an organo polysiloxane. Another example of a suitable material for use is polyurethane dimethyl siloxane made by GE Silicones under the Trademark AS4000.

Typically, sliding vehicle windows for installation in rigid environments are inherently thick (25–50 mm) due to the sliding track design; e.g. those found on buses or trains. Windows according to the invention may be provided in very slim form, suitable for use in soft films, such as fabrics used for soft tops of cars such as canvas, polyester nylon or polyurethane, possibly coated with polyvinyl chloride or other suitable coating material. Thus window panels for use in the present invention may be, for example, 3 to 5 mm or slightly more.

The means for attachment of the top of the surrounding fabric frame to the roof soft top of the vehicle may be any suitable available releasable sealing means. For example, a soft cylindrical bead may be provided along the top side edge of the soft top of the vehicle and a channel of similar soft rubbery material to fit the bead may be provided along the top outer edge of the surrounding canvas frame. To attach the surrounding canvas frame to the soft top of the vehicle it is only necessary to manually insert the bead into the channel where it will latch until deliberately disengaged. Such attachment means may be particularly suitable because it may be possible to remove the soft top of the vehicle including the window unit if desired.

The means for releasably attaching the window unit to the half door of the vehicle may be a bracket extending interiorly and downwardly from the lower edge of the window frame for example, a rod may be fixed to the lower edge of the window frame at least along the whole of its length and possibly extending to lie alongside part of the interior surface of the surrounding fabric frame. L-shaped brackets, the web of which corresponds in length to the thickness of the half door, extend interiorly and downwardly of the window unit. Preferably at least two, more preferably three of the brackets are present. The brackets latch over the edge of the half door to hold the window unit firmly and vertically with respect thereto.

This window unit of the invention may consist of three primary components; these being the window frame/track, the window panel and the surrounding fabric frame. Secondary components include the sealing attachment means between the fabric frame and the soft top, the attachment means between the fabric frame and the half door, the polyester flock for sealing between moving parts; a finger handle and/or locking mechanism for the sliding window panel; and urethane adhesive, rivets, etc. for attaching the frame portions together and an extruded aluminium division bar that is located on the sliding window at its interface with the fixed panel.

The invention includes the method of assembly of a window unit for releasable mounting on a half door of an automobile and releasably attachable in relationship with a top side edge of a soft top of the vehicle at least extending over the half of the door comprising: forming a surrounding frame of fabric material having, at a lower portion, means for releasable attachment to a half door of a motor vehicle and, at an upper edge, means for forming a releasable seal with a top side edge of a soft roof cover for the vehicle; forming a window frame attaching the window panel into the surrounding fabric frame by fixing a fixed window sub-panel on an interior frame portion of the window frame, locating a track for a sliding window sub-panel on the first window frame portion such that the sliding window portion panel lies parallel with the fixed window sub-panel and is slidable in the track between an open position and a closed position, the sliding panel overlying the fixed panel along one margin in the closed position and overlying fixed panel over a greater surface area in the open position; attaching an interior window frame portion to the exterior frame portion to form a U-channel about the track.

BRIEF DESCRIPTION OF THE DRAWINGS

Embodiments of the invention will now be described by way of example with reference to the drawings, in which.

DETAILED DESCRIPTION OF A PREFERRED EMBODIMENT

The drawings show a sliding window unit 10 having a window panel comprising a fixed window sub-panel 12 and a sliding window sub-panel 14, a surrounding fabric frame 16 formed of flexible material, preferably fabric, and a window frame 18. The window sub-panels 12, 14 are located in a U-shaped track 20 in a U-channel of window frame 18. The surrounding fabric frame 16 is attached, on the one hand to half door 22 of a vehicle by brackets 24 and, on the other hand, to soft top 26 also referred to as a soft roof structure of the vehicle through seal 28.

The units 10 should be sized and shaped to fit into the aperture formed by the top of the vehicle half door 22, the vehicle soft top 26 and the vehicle windshield 30. Generally, a rear edge 32 of the unit 10 would extend the line of the rear edge of the door 22 upwardly although there is no theoretical reason why the unit should not extend rearwardly of the door.

There is virtually no restriction in the size and shape of the window panel except that it should usually be as large as convenient and that there should be two opposite generally parallel edges if the units 10 are to have a sliding sub-panel. When the fixed sub-panel 12 and sliding sub-panel 14 are present, the overall shape of panel and the individual shapes of sub-panels 12, 14 should be such as to maximize the opening when sliding sub-panel 14 is slid back to open the window. Conveniently, to facilitate sliding the overlapping margins 34 of fixed sub-panel 12 and sliding sub-panel 14 may be vertical. A finger handle 36 is provided on the sliding sub-panel 14 positioned for optimum leverage of the user and to minimize any visual obstruction.

The two window sub-panels 12, 14 may be cut from extruded polycarbonate sheets which have been coated on both sides with a durable clear coating of an organo polysiloxane.

The polycarbonate material meets or exceeds the requirements of AS4 of the Federal Motor Vehicle Safety Standard #205 for rigid plastic glazing. The clear coating, which may be AS4000 manufactured by GE Silicones, increases the abrasion resistance of the sheet to exposures such as washing operations, airborne particles and human contact. It also improves the weatherability and chemical resistance of the windows.

Figure 4:
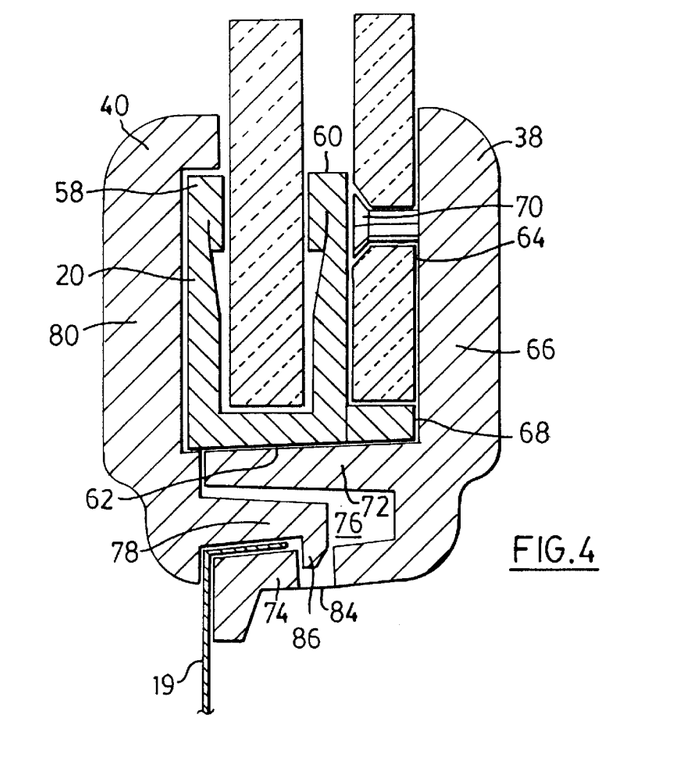
FIG. 4 is a section through the window frame of a window unit according to the invention.
Figure 5:
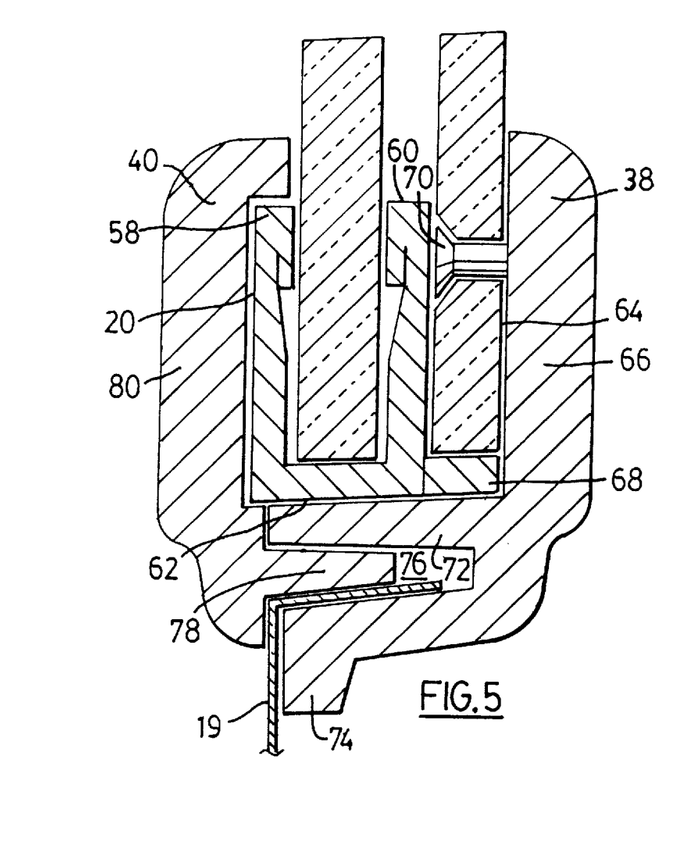
FIG. 5 is a section through another window frame of a window unit according to the invention.
Figure 6:
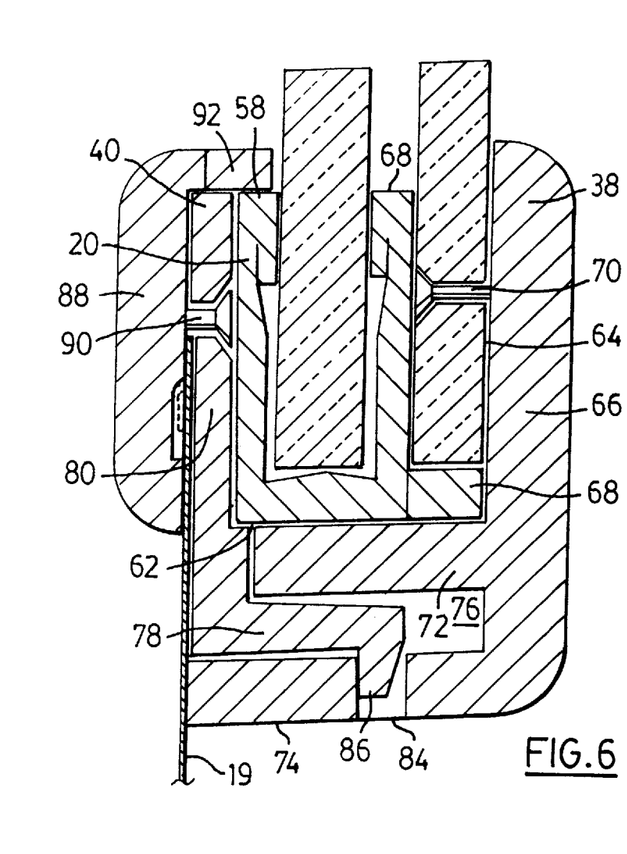
FIG. 6 is a section through yet another window frame according to the invention.

The window frame 18 is divided through its main plane into an interior frame portion 38 and an exterior frame portion 40. The frame portions 38, 40 fit together to form the composite frame 18. Various different sections of exemplary frames are shown in FIGS. 4–6.

If surrounding fabric frame 16 is wholly formed from a single layer of fabric, then only one continuous inner portion of fabric will be engaged in a clamped relationship. As can be seen from the figures, this clamped relationship allows the window frame and panel to be securely mounted within the surrounding frame without forming perforations through the inner portion. The fabric may be canvas, vinyl, plastic coated fabric of any form used for forming soft tops for motor vehicles. However, it is quite possible that surrounding fabric frame 16 is formed from a double layer of fabric at least in the region of its edge where reinforcement, and edge casing and/or a casing for a wire or bar based framework is required.

In order to make the surrounding fabric frame 16 retain its shape, the fabric 19 may be stretched over a wire or bar framework 42. This framework 42 may be protected by, and the appearance of the interior of the surrounding fabric frame 16 may be neatened by interior casing of doubled fabric covering the bars of the structure.

The window unit 10 may be mounted on the half door 22 of a vehicle by any convenient means. For example, a bar 44 may be provided just below and parallel with a lower edge of frame 18. L-shaped brackets 24 may be affixed to bar 44 with the leg 46 of each L depending downwardly. The foot 48 of each L is of a length corresponding with the thickness of the half door 22 on which the unit 10 is to be mounted.

Figure 2:
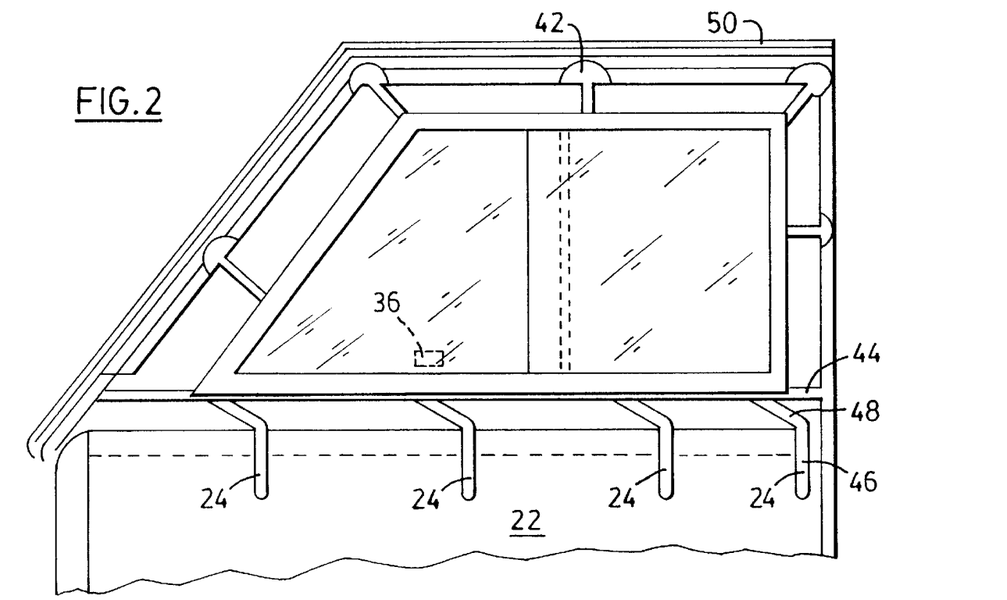
FIG. 2 shows a view of the window unit of FIG. 1 as seen from the interior of the car.
Figure 3:
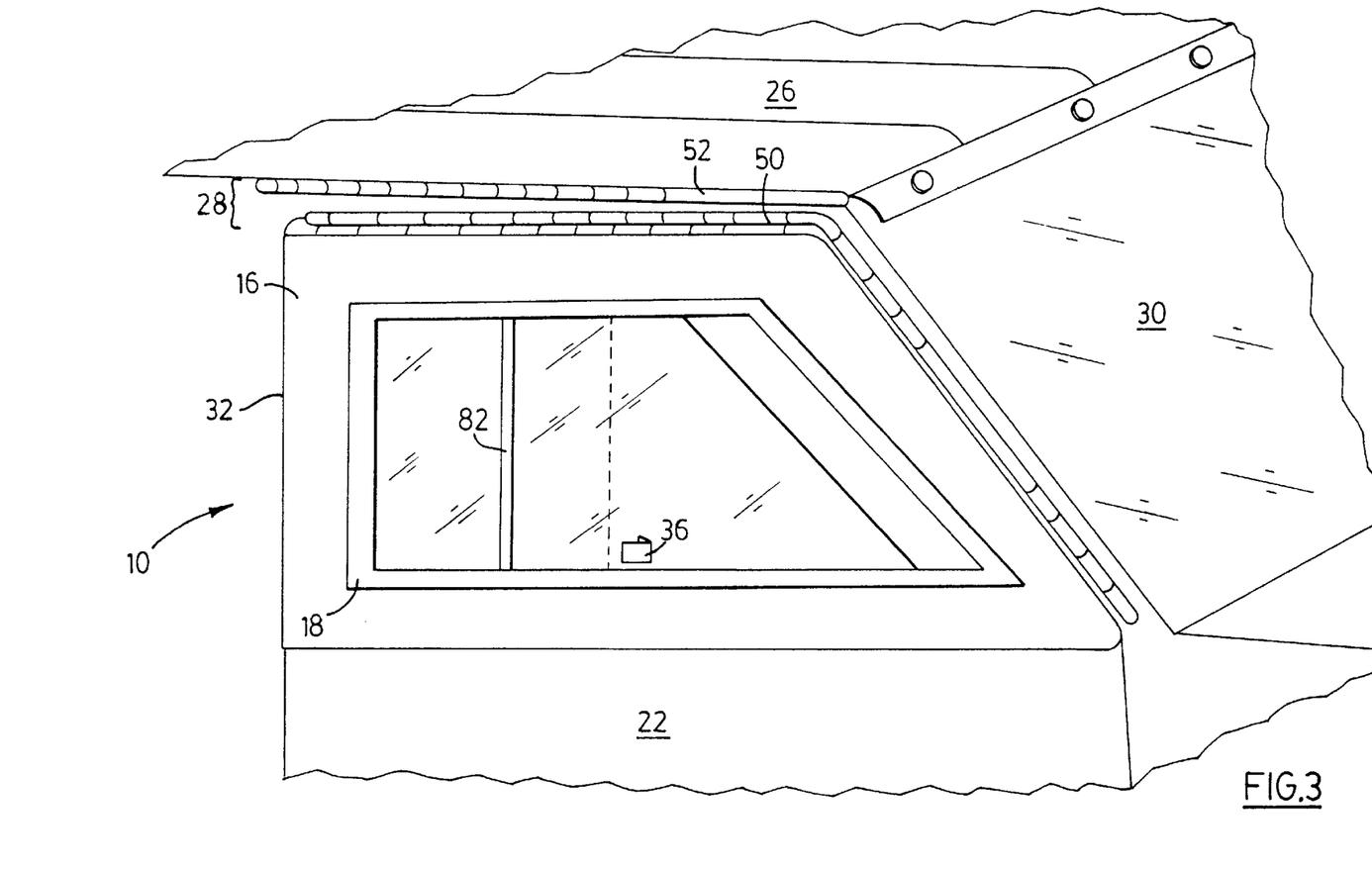
FIG. 3 shows a view similar to that of FIG. 1 with the window panels in the open position.

The surrounding fabric frame 16 held rigid by framework 42 forms a backing sheet for each bracket 24. Indeed, the bar 44 may be integral with an inner structure 42A of framework 42. Alternatively, as shown in FIG. 2, the window frame 18 may itself form the inner structure of the framework 42. The window unit 10 may be located on the half door 22 with the foot of each L bracket 24 resting on the top of the half door 22. The window unit 10 is held in position by the rigid fabric frame 16 to one side of the door and the depending legs 46 of each L bracket 24 to the other side of the door. The lower edge of rigid fabric frame 16 should overlap the top exterior margin of the door 22 and be held firmly against it.

Figure 1:
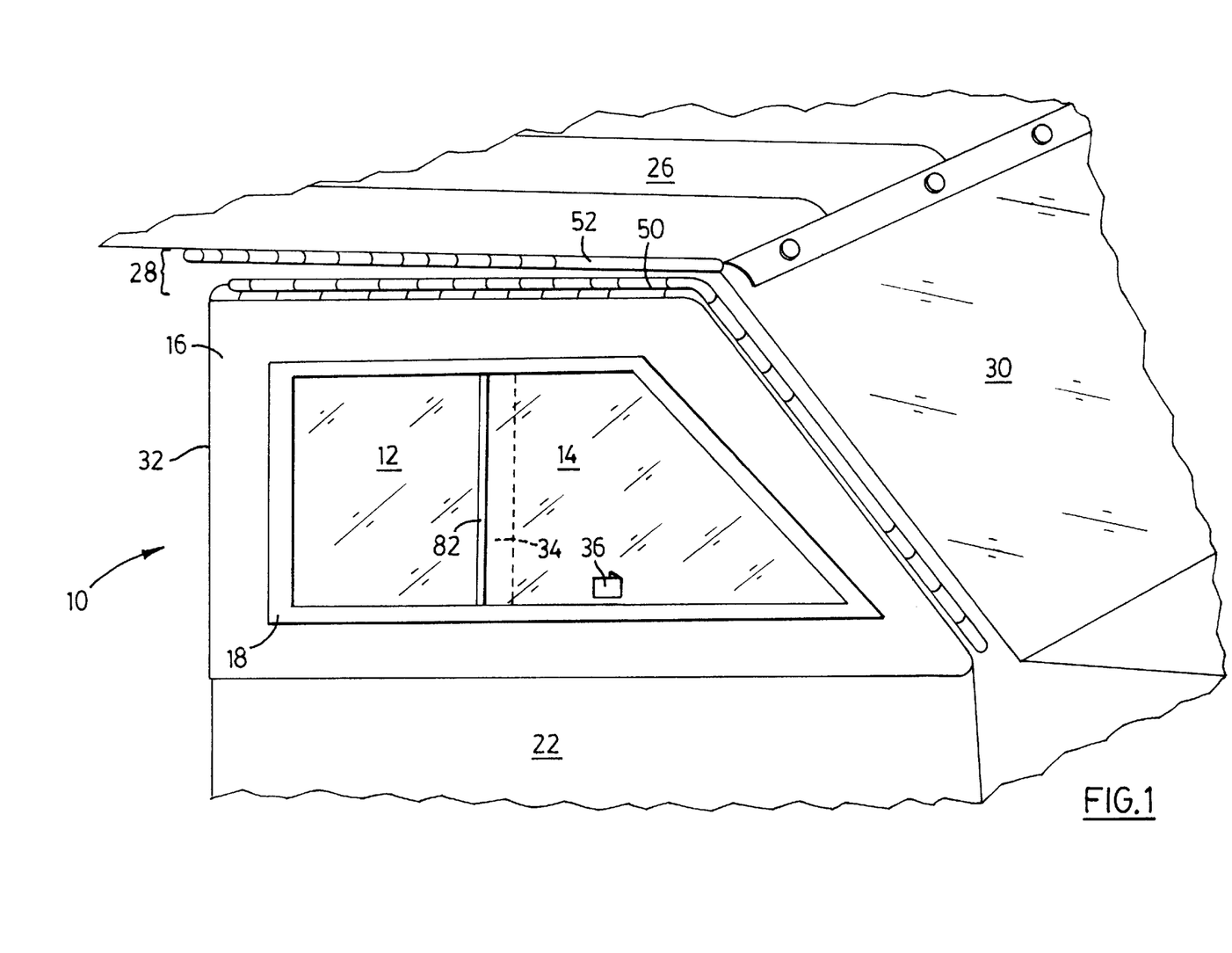
FIG. 1 is a view of a window unit according to the present invention as seen from the exterior of the car.

The seal between the window unit 10 and the soft top of the vehicle may be of any suitable type. However, as shown in FIG. 1 the seal may comprise a groove 50 along the top edge of the surrounding fabric frame 16 and a complementary bead 52 along the edge of the soft roof top of the vehicle. The bead 52 may be pressed into the groove 50 to form a seal. According to the relative degrees of hardness of the bead 52 and the groove 50 the seal may be sufficiently strong to hold the unit 10 in engagement with the soft top during putting up or taking down of the top. The seal, should, however, be manually disengagable for total removal of the window unit if desired.

The window panel, as shown in all of the embodiments, comprises the fixed window sub-panel 12 and the sliding window sub-panel 14. Specific differences between the embodiments of FIGS. 3–6 will be noted hereafter, but where possible similar reference numerals will be used for similar parts.

Track 20 is configured for both sub-panels. Sliding window sub-panel 14, may slide in U-shaped track 20 having an exterior leg 58 and an interior leg 60 and a web 62, while the edge of fixed window panel 12 lies in a U-channel 64 formed by the interior leg 60 of U-shaped track 20 and an interior flange 66 of interior window frame portion 38. An interiorly directed projection 68 of web 62 of track 20 forms the web of U-channel 64. Fixed window sub-panel 12 is fixed to flange 66 by means of a heat staked pin 70 extending from flange 66 through the thickness of fixed sub-panel 12.

The interior window frame portion 38 has a F-shaped main body portion of which one leg is flange 66 and the mid-leg is a flange 72 abutting the web 62 of track 20 and projection 68 forming the web of U-channel 64. The head flange 74 lies generally parallel with flange 72 about a recess 76 to latch with a flange 78 of exterior frame portion 40.

The exterior window frame portion 40 comprises a generally L-shaped body portion, has a flange 80 bounding exterior leg 58 of track 20 and a flange 78 fitting between flanges 72 and 74 of interior frame portion 38.

In the closed position of the sliding window sub-panel 14, its leading peripheral edge is also housed in the U-shaped track 20 and the trailing peripheral edge overlaps the fixed sub-panel 12. Sealing may be provided between fixed sub-panel and the trailing edge of the sliding sub-panel. This is achieved by the addition of an extruded aluminum strip 82 along the trailing edge of the sliding sub-panel 14. The extruded aluminum strip contains any suitable sealing means to seal against panel portion such as Fin-Seal weatherstrip (FinSeal is a trademark of Schlegal PLC). Other edges of sliding panel are housed in the track 20. Ingress of drafts or rain along these edges is less of a risk since the edges are protected on the one side by inner marginal portion of fixed panel and on the other side by flange of frame.

Window frame 18 extends around both the fixed sub-panel 12 and the sliding sub-panel 14 and is of a fixed cross-section. It may be made from any convenient material such as a plastics molding or an aluminum molding or a molding of any other suitable material. It is, however, considered preferable to form frame 18 from a material with a coefficient of expansion similar to that of the material of the fixed panel 12 and the sliding panel 14. Suitably, fixed panel 12 and sliding panel 14 are formed from transparent polycarbonate material and frame 18 is also formed from polycarbonate material.

The track 20 may be lined with a flock channel liner (not shown) for easy sliding of sliding panel 14. The flock channel liner may be, for example, 80 black PET flock tape by Dorrie International.

Suitably, the track 20 is wide enough to allow for the presence of a spacer bar which may be made of molded polycarbonate, between fixed window panel 12 and sliding window panel 14. Thus, smooth sliding of panel 14 may be possible without the surfaces of the panels tending to jam against each other.

FIG. 4 shows an embodiment of the window frame 18 in which the interior frame portion 38 and the exterior frame portion 40 snap together to engage the inner edge portion of fabric 19 therebetween in a clamp relationship. The head flange 74 of the F-section interior frame portion 38 is provided with a number of apertures 84. Flange 78 of exterior frame portion 40 is provided with lugs 86 complementary to apertures 84. The flange 78 is somewhat resilient so that when lug 86 is pressed into the recess 76 between flanges 72 and 74 of the interior frame portion 38, its resilience biases it towards flange 74. When lugs 86 register with apertures 84, flange 78 moves to snap lug 86 into aperture 84. In fact both flanges 74 and 78 will have some resilience since they will usually be formed from the same material. Thus while the description has referred to the movement of flange 78, the will be relative movement between flanges 74 and 78.

FIG. 5 shows a force fit between interior frame portion 38 and exterior frame portion 40. In this case flanges 72 and 74 of the F-section interior frame portion provide a recess 76 which narrows towards the interior flange or leg 66 of the F. Flange 78 of exterior frame portion 40 is tapered to narrow towards its distal end. The taper of recess 76 and flange 78 may be such as to form a firm connection between the exterior and interior frame portions 38, 40 with the edge of fabric 19 trapped firmly between them. It may be desirable, however, to use additional fixing means to attach flange 78 securely in recess 76. Such additional fixing means may be adhesive or welding such as ultrasonic welding.

FIG. 6 shows a slightly different embodiment in which the edge of fabric 19 is clamped between exterior frame portion 40 and an additional outer decorative trim strip 88. The interior and exterior frame portions 38, 40 snap together as described for the embodiment of FIG. 4 but without the edge of fabric 19 clamped therebetween. This embodiment may have the advantage that the actual act of snapping the parts together may be more precise. Before the frame portions are snapped together the edge of fabric 19 is clamped between the outer decorative trim member 88 and the outer surface of flange 66 of exterior frame portion 40. The trim strip 88 may be fixed to the exterior frame portion 38 by any convenient means such as bolts, rivets, or a heat staked pin 90 through the exterior frame portion. The edge of fabric 19 may be trapped between the exterior frame portion 38 and the decorative trim strip 82 solely due to the fixing between the strip and the frame portion. It is, however, considered advantageous to provide additional fixing means such as adhesive between the trim strip and the fabric.

It is to be noted that while the decorative trim strip 88 is referred to as decorative, an advantage of this embodiment is that the trim strip may be a very slim, lightweight strip having a virtually plain outer surface. It is considered that the visual appearance of such a frame from the outside may be particularly clean and neat. The trim strip 88 may have a flange 92 covering the join between the exterior frame portion 40 and the track 20 for sliding the glass panel 14. This may provide advantages in waterproofing and sealing the unit against leakage. Similarly the exterior frame portions as illustrated in FIGS. 4 and 5 may be provided with a similar cover flange 94 to cover the top edge of the adjacent leg of track 17.

In assembly of the window, the track 17 is fitted with flock. Fixed window sub-panel 12 is mounted to flange 66 by means of heat staked pin 70 so that its margin abuts flange 66 and its edge is spaced from flange 72 by a distance equal to the thickness of projection 68 of web 62 of track 20. A length of track 20 is then located about the margin of sliding window sub-panel 14. The length of track 20 should be long enough to extend around the inner perimeter of window frame 18. The sliding window sub-panel 14 and track 20 are then assembled with interior frame portion 38 which has been attached to the fixed window sub-panel 12.

For the embodiments of FIGS. 4 and 5 an inner edge of fabric 19 is tucked into position between flanges 72 and 74 of interior frame portion 38. The flange 78 of exterior frame portion 40 is then pushed between flanges 72 and 74 to clamp the fabric 19 and to abut flange 80 against exterior leg 58 of track 20 and to at least hold the exterior and interior frame portions together. For the embodiment of FIG. 4 pushing the resilient flange 78 into the position just described brings flange latch 86 into register with aperture 84. Flange latch 86 is biased into aperture 84 to lock the frame portions together.

For the embodiment of FIG. 5 the flange 78 makes a force fit between flanges 72 and 74. It may be permanently fixed by means of adhesive, ultrasonic welding, bolting, etc.

For the embodiment of FIG. 6 the fabric is clamped between the trim strip and the exterior frame portion 40 before the exterior frame 40 is fitted to interior frame portion 38. Clamping may be by means of heat staked pin 90 from decorative strip 88 through fabric 19. The exterior and interior frame portions 38, 40 are then pushed together without any insertion of fabric 19 between flanges 72 and 74. FIG. 6 shows a similar latching mechanism to that of FIG. 4 but it is to be understood that the latching mechanism of FIG. 5 or any other convenient means is also possible. The sliding panel 14 is then inserted into its L-channel.

The fixed panel 12 is then placed and fixed onto the frame 16 thus completing the assembly of the sliding window module.

A finger handle/locking mechanism 36 is located in the lower front corner of the sliding window 14 and can be functional from both inside and outside the vehicle.

I claim:

1. A window unit configured to be removably mounted in an operative position in a motor vehicle having a half door and a soft roof structure disposed above the half door, said window unit comprising:

a rigid, transparent window panel;

a surrounding frame of flexible material, a lower portion of said surrounding frame being configured to be releasably attached to an upper portion of the half door of the motor vehicle, an upper portion of said surrounding frame being configured to be releasably attached to a side edge of the soft roof structure of the motor vehicle;

a window frame mounted within a window-receiving opening formed through said surrounding frame, said window frame having a window track provided therein, said window panel being mounted within said window frame and having an outer peripheral edge thereof received in said window track;

said surrounding frame having an inner portion extending around said window-receiving opening, said inner portion being devoid of openings, said window frame engaging said inner portion of said surrounding frame in a clamped relationship such that clamping forces are applied to oppsing surfaces of said inner portion to thereby secure said window frame and said window panel within said window-receiving opening of said surrounding frame solely by virtue of the aforesaid clamped relationship without forming openings through said inner portion of said surrounding frame.

2. A window unit according to claim 1, wherein said window panel comprises a fixed sub-panel and a sliding sub-panel, said sliding sub-panel being disposed parallel to said fixed sub-panel and being slidably movable within said window track between an open position and a closed position.

3. A window unit according to claim 2, wherein a peripheral edge of said sliding sub-panel overlaps a peripheral edge of said fixed sub-panel, said peripheral edges of said sub-panels extending in a generally vertical direction when said window unit is removably mounted in the operative position thereof, said sliding sub-panel being slidably moveable in a direction extending generally parallel to the side edge of said soft roof structure and the upper portion of said half door during movement between said open and closed positions thereof when said window unit is removably mounted in the operative position thereof.

4. A window unit according to claim 3, wherein said window frame comprises an exterior frame portion and an inwardly facing U-shaped channel portion, said fixed sub-panel being fixedly mounted between said exterior frame portion and one leg of said U-shaped channel portion, said sliding sub-panel being slidably mounted within said U-shaped channel portion.

5. A window unit according to claim 4, wherein said window frame further comprises an interior frame portion, said exterior frame portion and said interior frame portion cooperating to engage the inner portion of said surrounding frame in the aforesaid clamped relationship.

6. A window unit according to claim 5, wherein said interior frame portion and said exterior frame portions are connected together by complementary resilient latches.

7. A window unit according to claim 5, wherein said interior frame portion and said exterior frame portion are force fitted together.

8. A window unit according to claim 1, wherein said window frame comprises an interior frame portion and an exterior frame portion, said interior frame portion and said exterior frame portion cooperating to engage said inner portion of said surrounding frame in the aforesaid clamped relationship.

9. A window unit according to claim 1, wherein said window frame comprises an exterior decorative trim portion and another frame portion, said exterior decorative trim portion and said another frame portion cooperating to engage said inner portion of said surrounding frame in the aforesaid clamped relationship.

10. A window unit according to claim 29, wherein said window frame comprises an interior frame portion and an exterior frame portion, said exterior frame portion being said another frame portion.

11. A window unit according to claim 1, wherein said upper portion of said surrounding frame is configured to be releasably attached to the side edge of the soft roof structure in a sealed relationship.

12. A method for assembling a window unit configured to be removably mounted in an operative position in a motor vehicle having a half door and a soft roof structure disposed above the half door, said method comprising the following steps:

providing a surrounding frame of flexible material having a window-receiving opening formed therethrough, a lower portion of said surrounding frame being configured to be releasably attached to an upper portion of the half door of the motor vehicle, an upper portion of said surrounding frame being configured to be releasably attached to the side edge of the soft roof structure of the motor vehicle, said surrounding frame having an inner portion extending around said window-receiving opening, said inner portion being devoid of openings;

providing a rigid, transparent window panel;

providing a window frame for mounting said window panel within said window-receiving opening formed through said surrounding frame, said window frame having a window track provided therein, said window track being configured to receive an outer peripheral edge of said window panel;

mounting said window panel within said window frame such that said outer peripheral edge of said window panel is received within said window track; and engaging said window frame with said inner portion of said surrounding frame in a clamped relationship such that clamping forces are applied to opposing surfaces of said inner portion of said surrounding frame to thereby securely mount said window panel and said window frame within window-receiving opening of said surrounding frame solely by virtue of the aforesaid clamped relationship without forming openings through said inner portion of said surrounding frame.

13. A window module configured to be mounted in an operative position within a surrounding frame of flexible material attached to a motor vehicle, the surrounding frame having a window-receiving opening formed therethrough and an inner portion extending around said window-receiving opening, the inner portion being devoid of openings, the module comprising:

a rigid, transparent window panel;

a window frame configured to be mounted within the window-receiving opening formed though the surrounding frame of the motor vehicle, said window frame having a window track provided therein, said window panel being mounted within said window frame and having an outer peripheral edge thereof received in said window track;

said window frame being constructed and arranged to engage the inner portion of the surrounding frame in a clamped relationship such that clamping forces are applied to opposing surfaces of said inner portion to thereby secure said window module in said operative position within the window-receiving opening of the surrounding frame solely by virtue of the aforesaid clamped relationship without forming openings through said inner portion of said surrounding frame.

14. A window module according to claim 13 wherein the window panel comprises at least two sub-panels, at least one of said sub-panel being slidably mounted within said window track.

15. A window module according to claim 14 wherein one of said two sub-panels is fixedly mounted within said window track.

16. A window module as claimed in claim 14 wherein said two sub-panels are formed of transparent polycarbonate material.

17. A window unit according to claim 16, wherein said window frame comprises an exterior frame portion and an inwardly facing U-shaped channel portion, said fixed sub-panel being fixedly mounted between said exterior frame portion and one leg of said U-shaped channel portion, said sliding sub-panel being slidably mounted within said U-shaped channel portion.

18. A window unit according to claim 17, wherein said window frame further comprises an interior frame portion, said exterior frame portion and said interior frame portion cooperating to engage the inner portion of the surrounding frame in the aforesaid clamped relationship.

19. A window unit according to claim 18, wherein said interior frame portion and said exterior frame portions are connected together by complementary resilient latches.

20. A window unit according to claim 18, wherein said interior frame portion and said exterior frame portion are force fitted together.

21. A window unit according to claim 13, wherein said window frame comprises an interior frame portion and an exterior frame portion, said interior frame portion and said exterior frame portion cooperating to engage said inner portion of said surrounding frame in the aforesaid clamped relationship.

22. A window unit according to claim 13, wherein said window frame comprises an exterior decorative trim portion and another frame portion, said exterior decorative trim portion and said another frame portion cooperating to engage the inner portion of the surrounding frame in the aforesaid clamped relationship.

23. A window unit according to claim 37, wherein said window frame comprises an interior frame portion and an exterior frame portion, said exterior frame portion being said another frame portion.

* * * * *